G. B. EVANS.
CURRENT COLLECTOR.
APPLICATION FILED JUNE 4, 1921.

1,431,295.

Patented Oct. 10, 1922.

INVENTOR
George B. Evans
BY
E. E. Huffman
ATTORNEY

Patented Oct. 10, 1922.

1,431,295

UNITED STATES PATENT OFFICE.

GEORGE B. EVANS, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

CURRENT COLLECTOR.

Application filed June 4, 1921. Serial No. 474,973.

*To all whom it may concern:*

Be it known that I, GEORGE B. EVANS, a citizen of the United States of America, residing at the city of St. Louis, State of Missouri, have invented a certain new and useful Current Collector, of which the following is such a full, clear, and exact description as will enable any one skilled in the art to which it appertains to make and use the same, reference being had to the accompanying drawings, forming part of this specification.

My invention relates to current collectors for electric machines such as generators, motors, rotary converters, and other types of alternating current machines in which contact is maintained between brushes and ring contacts mounted on a rotating element.

Such ring contacts have heretofore been made of brass castings but on account of the difficulty of securing homogeneous castings the rings frequently wear unevenly and it is one object of my invention to provide a collector ring not subject to this objection. Another object is to provide a collector ring assembly of economical and efficient construction.

Figure 1:
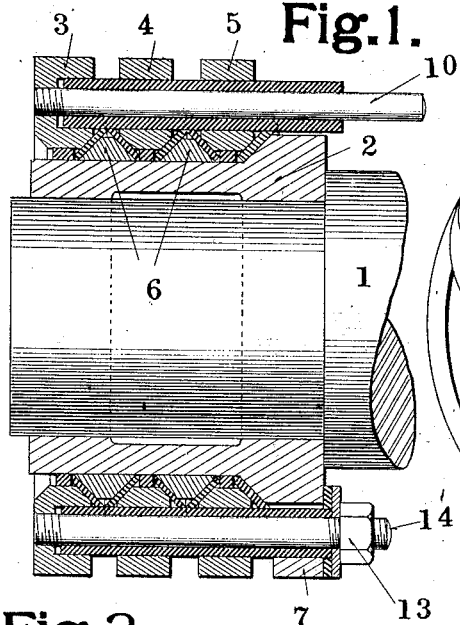
Figure 2:
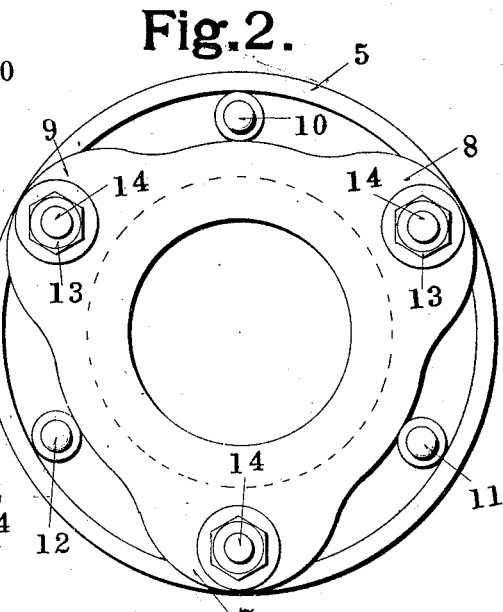
Figure 3:
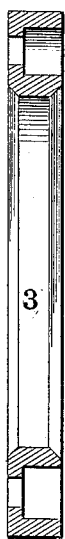
Figure 4:
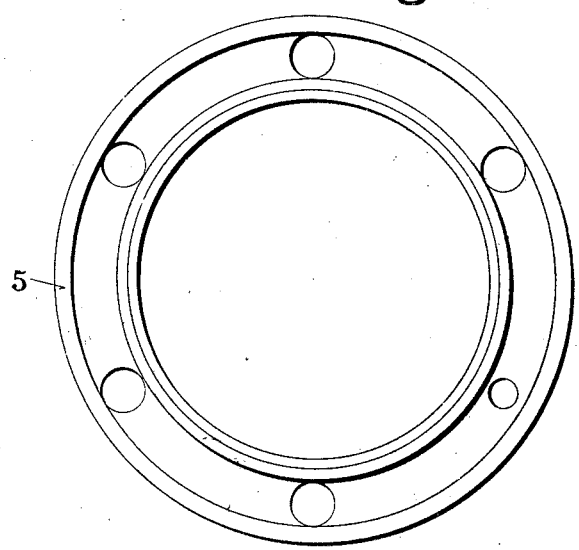

In the accompanying drawings, Figure 1 is a cross sectional view of a collector ring assembly embodying my invention; Figure 2 is an end view of the same; Figure 3 is a cross sectional view of the outer collector ring shown in Figure 1; and Figure 4 is a side view of the inner ring shown in Figure 1. 1 represents an end of the armature shaft of an alternating current machine, preferably turned down as shown, and on the turned down portion is mounted a cylindrical shell 2. Mounted on this shell and insulated therefrom as shown are channelled collector rings 3, 4, and 5, these rings having their inner peripheries tapered and are separated by distance rings 6 embracing and slidable on the shell 2 and insulated from the collector rings. The shell is provided with radially extending lugs 7, 8, and 9 and clamping bolts 14 are connected to the outer collector ring and pass through the intermediate rings 4 and 5, and through the lugs on the shell. By means of these bolts and the nuts 13 the collector rings and distance rings are firmly clamped together and against the shoulder on the shell 2. These clamping bolts also serve to prevent any circumferential movement of the rings with respect to the shell. To each conductor ring is attached a conductor or terminal stud, the stud 10 being connected to the outer ring, 11 to the middle ring and 12 to the inner ring and stud 10 passing through openings in the rings 4 and 5 and stud 11 through another opening in the ring 5. These studs 10, 11, and 12 pass over the outer periphery of the shell 2 and between the lugs 7, 8, and 9 and terminate in a convenient position for the attachment of the armature conductors.

To avoid the difficulty hereinbefore mentioned in connection with the use of brass castings for forming collector rings, I press these rings preferably from rolled flat stock of brass or other suitable material and in channel shape as shown with the channel opening in a direction parallel to the axis of the ring. With this construction the outer wall of the channel forms the brush bearing surface, the inner wall the supporting surface which bears on the distance rings through the insulation, and the vertical wall the means for attachment of the clamping bolts and conductor studs. The inner ring 5 as shown in Figure 4 has its vertical wall provided with five holes, three for the passage of the clamping bolts and two for the passage of the conductor studs 10 and 11. With the construction described, the collector rings will wear evenly and by reason of the channels and the free spaces between rings the ring assembly is well adapted for the rapid dissipation of heat.

Having fully described my invention, what I claim as new and desire to secure by Letters Patent of the United States is:

1. A current collector for a dynamo electric machine comprising a supporting member, a plurality of collector rings, means insulating the rings from each other, and spaced clamping bolts attached to the outer ring and extending through the vertical walls of the other rings.

2. A collector ring for a dynamo-electric machine comprising a single piece of rolled conductive material of circular channel shape with the outer surface of the ring parallel to the axis of the ring.

3. A collector ring for a dynamo-electric machine comprising a single piece of rolled conductive material of circular channel shape with the channel opening laterally and with the outer surface of the ring parallel to the axis of the ring.

4. A collector ring for a dynamo electric machine consisting of a one piece circular channel member of rolled conductive material U-shaped in cross section with the channel opening laterally, its outer wall forming a brush bearing surface and its inner a support bearing surface.

5. A current collector for a dynamo electric machine comprising a supporting member having a cylindrical outer surface, and radially extending lugs at one end, a plurality of collector rings on said member and insulated therefrom and from each other and clamping bolts extending from said lugs to the outer ring and through the intermediate rings.

6. A current collector for a dynamo electric machine comprising a supporting member having a cylindrical outer surface and radially extending lugs at one end, a plurality of collector rings on said member and insulated therefrom and from each other and clamping bolts extending from said lugs to the outer ring and through the intermediate rings, and conducting members attached to the rings and extending between the lugs.

7. A current collector for a dynamo electric machine comprising a cylindrical supporting member, a plurality of collector rings mounted thereon and U-shaped in cross section with the channel opening laterally, spacing members between the rings, and spaced clamping bolts attached to the outer ring and extending through the vertical walls of the other rings and above the spacing members.

In testimony whereof, I have hereunto set my hand and affixed my seal.

GEORGE B. EVANS. [L. S.]